United States Patent

Iwamoto

[11] Patent Number: 5,106,159
[45] Date of Patent: Apr. 21, 1992

[54] REVOLVABLE SEAT WITH A DETACHABLE ARMREST CONTAINING A RECHARGEABLE VIBRATOR

[75] Inventor: Hiroaki Iwamoto, Kanagawa, Japan
[73] Assignee: Ikeda Bussan Co., Ltd., Ayase, Japan
[21] Appl. No.: 648,646
[22] Filed: Jan. 31, 1991

[30] Foreign Application Priority Data

Mar. 24, 1990 [JP] Japan ............... 2-30083[U]

[51] Int. Cl.⁵ .................................. A47C 7/54
[52] U.S. Cl. ........................ 297/416; 297/217;
297/194; 297/240; 128/33
[58] Field of Search ............... 297/115, 116, 117, 194,
297/227, 411, 414, 415, 416, 417, 394, 217, 227,
160, 153, 188, 412, 422, 349, 240, 189; 128/33,
845, 376, 377, 378, 32; 248/118, 118.1, 118.3

[56] References Cited

U.S. PATENT DOCUMENTS

| | | | |
|---|---|---|---|
| 975,374 | 11/1910 | Shalansky | 297/416 |
| 1,890,102 | 12/1932 | Urquhart | 297/416 |
| 2,492,671 | 12/1949 | Wettlaufer | 128/33 |
| 2,694,394 | 11/1954 | Miller | 128/33 |
| 2,863,494 | 12/1958 | Lautier et al. | 297/422 |
| 3,464,405 | 9/1969 | Kallus | 128/33 |
| 3,955,222 | 5/1976 | Pater | 128/33 |
| 4,067,613 | 1/1978 | Pesiri | 297/416 |
| 4,116,233 | 9/1978 | Scaduto | 128/32 |
| 4,118,069 | 10/1978 | Hunter | 297/416 |
| 4,136,685 | 1/1979 | Ramey | 128/33 |
| 4,509,097 | 4/1985 | Robinson | 297/194 X |
| 4,619,478 | 10/1986 | Heimnick et al. | 297/411 |
| 4,971,393 | 11/1990 | Maisenhalder | 297/397 |

FOREIGN PATENT DOCUMENTS 61-43530 3/1986 Japan.

Primary Examiner—Kenneth J. Dorner
Assistant Examiner—James M. Gardner
Attorney, Agent, or Firm—Foley & Lardner

[57] ABSTRACT

A seat assembly which is revolvable about a vertical axis comprises a seat cushion, a seatback and an armrest. A pair of armrest holders are secured to both sides of the seat cushion respectively. Each armrest holder is constructed to detachably hold the armrest. The armrest has a rechargeable vibrator disposed inside the armrest. And, the armrest is supported by two metal rods and recharged through the rods.

9 Claims, 3 Drawing Sheets

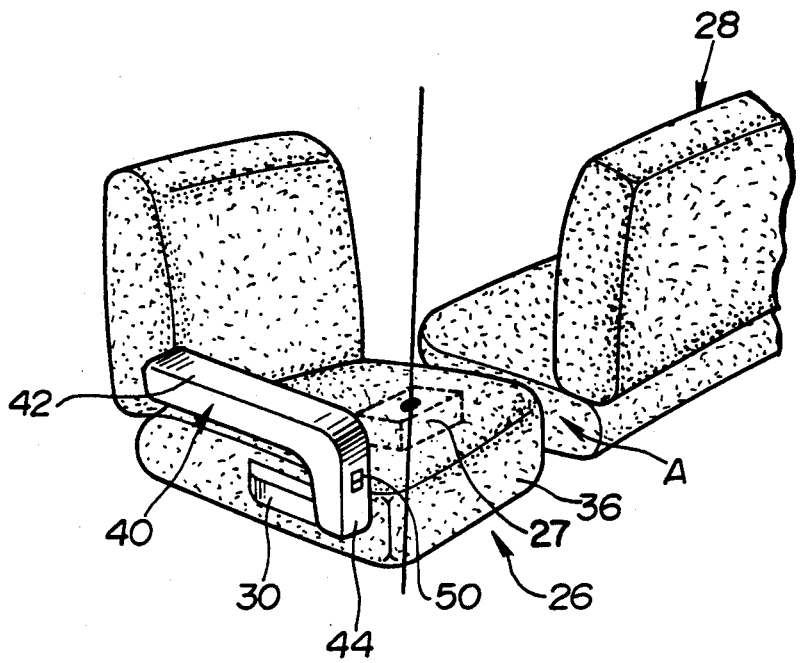
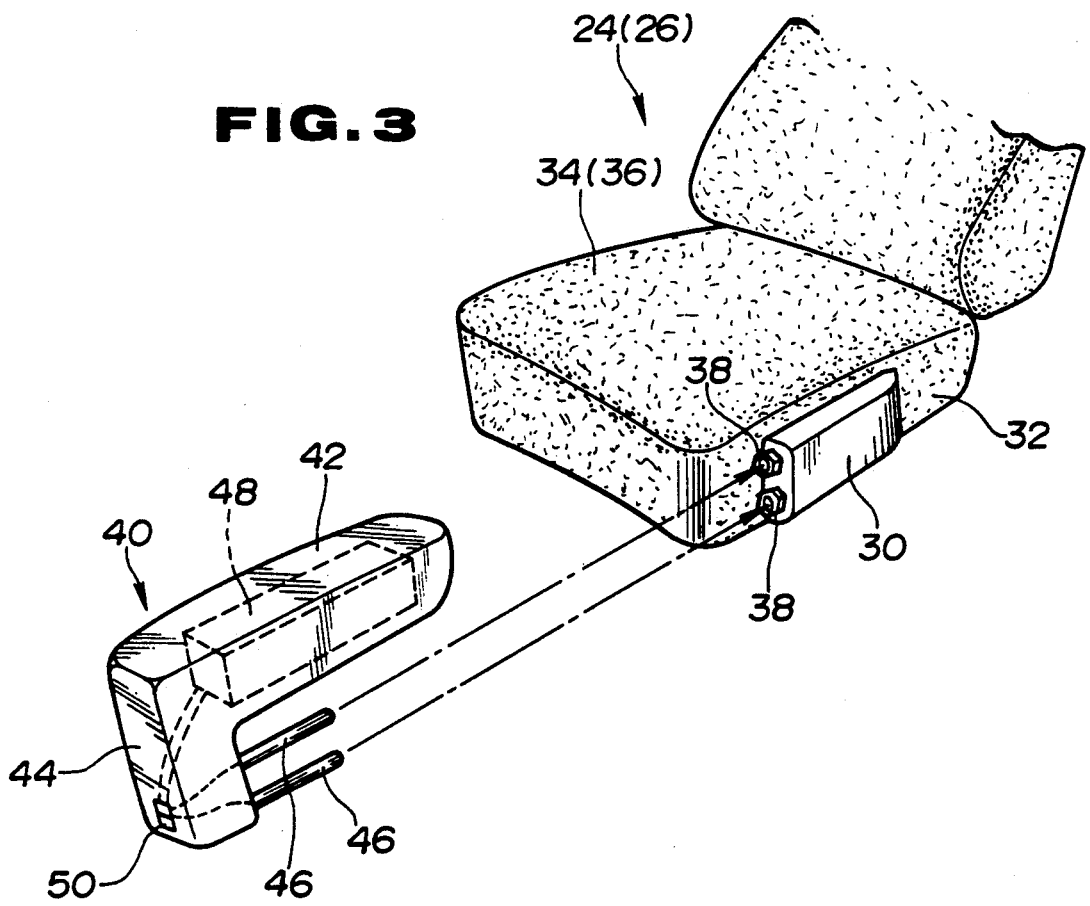

REVOLVABLE SEAT WITH A DETACHABLE ARMREST CONTAINING A RECHARGEABLE VIBRATOR

BACKGROUND OF THE INVENTION

1. Field of the Invention

The present invention relates in general to vehicular seats, and more particularly to vehicular seats of a type which is equipped with an armrest and revolvable about a vertical axis thereof.

2. Description of the Prior Art

In order to clarify the task of the present invention, one conventional vehicular seat of the above-mentioned type will be outlined with reference to FIGS. 4 and 5 of the accompanying drawings.

As shown in FIG. 4, a seat 10 of the above-mentioned type is positioned beside a seat 12 which comprises generally a seat cushion 14 and a seat back 16. The seat 10 comprises generally a seat cushion 18, a seat back 20 and an armrest 22. The seat 10 is revolvable about a vertical axis relative to a vehicular floor (not shown). Therefore, as is seen from FIG. 5, the seat 10 can turn from a forwardly directed position to a rearwardly directed position, and vice versa. The armrest 22 is rigidly secured to a side surface of the seat cushion 18.

However, the seat 10 has the following drawbacks.

First, since the armrest 22 is secured to one side of the seat 10, only one arm (viz., left arm in the illustrated case) of a seat occupant can receive the arm supporting function from the armrest 22. That is, the other arm of the seat occupant can not receive such function from the armrest 22.

Second, because of the provision of the armrest, the two seats 10 and 12, when they face in the same direction, must be positioned with a considerably large space "B" therebetween as is seen from FIG. 4. In fact, if the space "B" is not large enough, the turning of the seat 10 is not permitted because the armrest 22 would abut against the seat 12 during the turning. As is easily understood, such large space "B" located between the seats 10 and 12 causes not only uncomfortableness with which the seat occupants sit on the seats 10 and 12 but also lowering in the seating capacity of the seats 10 and 12.

SUMMARY OF THE INVENTION

Therefore, it is an object of the present invention to provide a vehicular seat, which is free of the above-mentioned drawbacks.

According to the present invention, there is provided a seat assembly which includes a seat proper, means for permitting the seat proper to turn about a vertical axis, an armrest and a pair of armrest holders which are secured to both sides of the seat proper respectively, each armrest holder being constructed to detachably hold the armrest.

BRIEF DESCRIPTION OF THE DRAWINGS

Other objects of the present invention will become apparent from the following description when taken in conjunction with the accompanying drawings, in which:

FIG. 2 is a perspective but partially cut away view of the seats, showing one of the seats of the invention, the seat assuming a rearwardly directed position;

FIG. 3 is a perspective view of the seat of the invention in a condition wherein an armrest is detached from the seat proper;

DETAILED DESCRIPTION OF THE INVENTION

Figure 1:
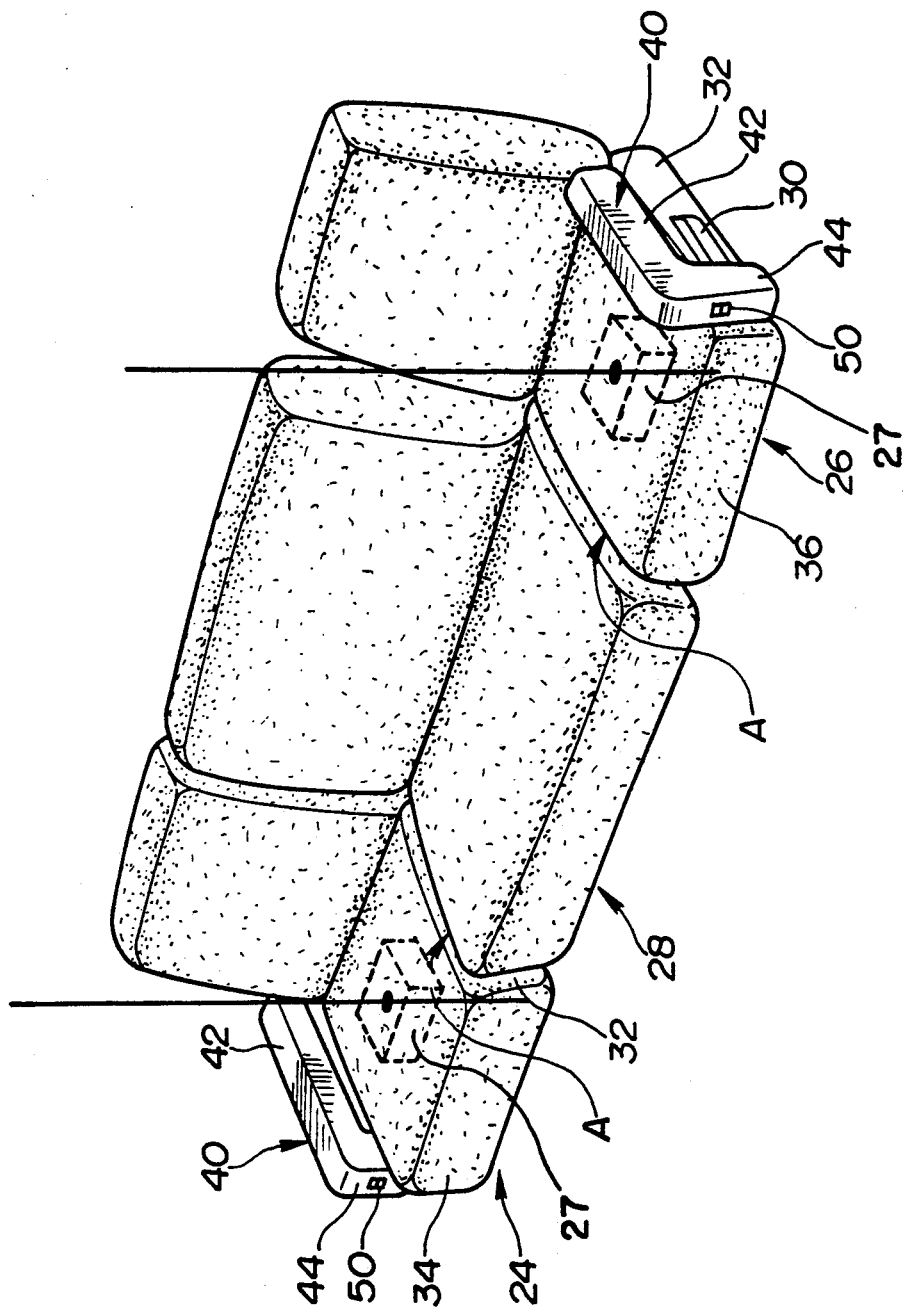
FIG. 1 is a perspective view of seats arranged abreast, two of which are according to the present invention.
Figure 4:
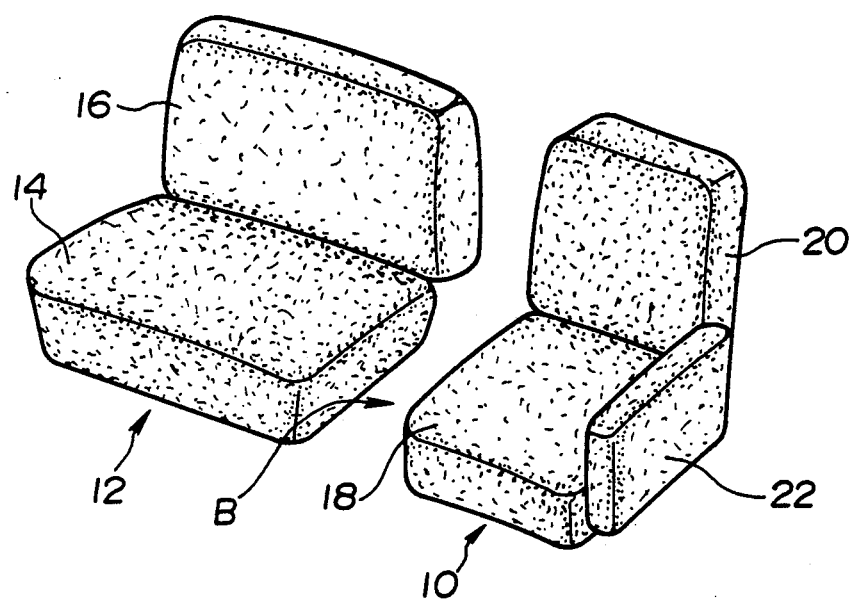
FIG. 4 is a view similar to FIG. 1, but showing a conventional seat.
Figure 5:
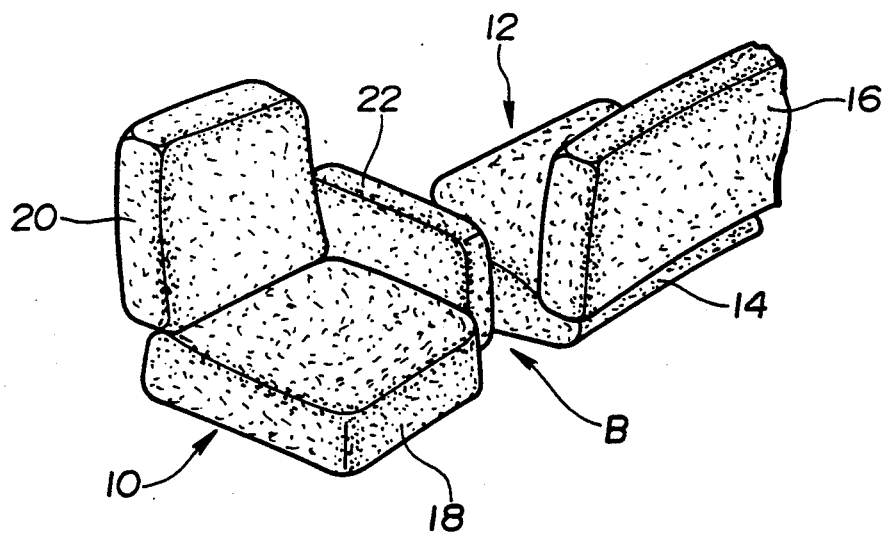
FIG. 5 is a view similar to FIG. 2, but showing the conventional seat.

Referring to FIGS. 1-3, particularly FIG. 1, there are shown three vehicular seats 24, 28, and 26 which are arranged abreast. Two of them, that is, the seats 24 and 26 are constructed in accordance with the present invention.

As is seen from FIG. 1, the two seats 24 and 26 are substantially the same in construction and positioned beside the center seat 28 so as to have respective spaces "A" therebetween. Both seats 24 and 26 can turn from a forwardly directed position to a rearwardly directed position and vice versa (see FIG. 2) by rotating about a rotating mechanism 27. The center seat 28 may be either non-revolvable or revolvable about a vertical axis relative to the vehicle floor.

As is seen from FIG. 3, an armrest holder 30 is rigidly secured to each side surface 32 of a seat cushion 34 of 36 or the seat 24 or 26. The armrest holder 30 has two hexagonal nuts 38 which are secured to upper and lower portions of a front surface thereof. Although not shown in the drawings, a known latch mechanism is installed in the armrest holder 30 for the purpose of which will be clarified hereinafter.

Designated by numeral 40 is an armrest which is generally L-shaped including a major horizontal portion 42 and a vertical portion 44. Two parallel metal rods 46 are secured to and rearwardly extend from a rear surface of the vertical portion 44 of the armrest 40. The metal rods 46 serve as electric terminals. The armrest 40 is equipped with a rechargeable vibrator 48 inside the major horizontal portion 42. A switch 50 for the vibrator 48 is provided at a front lower surface of the vertical portion 44. The vibrator 48 and the rods 46 are connected through the switch 50.

When it is intended to turn the seat 24 or 26 from the forwardly directed position to the rearwardly directed position, and vice versa, the armrest 40 is disengaged from the armrest holder 30. Then, the seat 24 or 26 is turned. Then, depending on the seat occupant's reference, the armrest 40 is engaged to the armrest holder 30 on either side of the seat cushion 34 or 36. Furthermore, depending on the seat occupant's preference, two armrests 40 can be connected to one seat 24 or 26.

Since the turning of the seat 24 or 26 is carried out without the armrest 40, the space "A" between the seat 24 or 26 and the seat 28 can be narrowed as compared with that of the afore-mentioned conventional seats. Thus, the effective width of each seat 24, 26 or 28 can be increased as compared with that of the conventional seats, thereby providing seat occupants with more comfortable sitting feeling.

When it is intended to use the armrest 40, the rods 46 of the armrest 40 are thrust into holes of the nuts 38 of the armrest holder 30 until the rods 46 reach a certain position. Under this condition, the rods 46 of the armrest 40 are tightly but detachably held by the latch mechanism in a snap-action manner and the rods 46 are electrically connected to an electric source (not shown), thereby charging a battery of the vibrator 48.

When it is intended to use the armrest 40 as a vibrator, the armrest 40 is strongly pulled forwardly to disengage the rods 46 from the armrest holder 30. Then, the armrest 40 is brought into abutment with a desired part of a seat occupant's body, and the vibrator 40 is switched on with the switch 50 to massage his or her body.

What is claimed is:

1. A seat assembly comprising:
    a seat proper;
    means for permitting said seat proper to turn about a vertical axis;
    an armrest having two metal rods projecting therefrom, said metal rods being means for providing sole support for said armrest;
    a rechargeable vibrator disposed in said armrest and rechargeable through said metal rods which serve as electric terminals; and
    a pair of armrest holders secured to both sides of said seat proper respectively, each armrest holder being constructed to detachably hold said armrest, each armrest holder having two holes dimensioned to receive a respective one of said metal rods therein.

2. A seat assembly as claimed in claim 1, in which said seat proper comprises a seat cushion.

3. A seat assembly as claimed in claim 2, in which said pair of armrest holders are secured to both sides of said seat cushion respectively.

4. A seat assembly as claimed in claim 3, wherein each of said armrest holders has a front wall portion in which said holes are located, each of said metal rods projecting rearwardly and horizontally from a respective one of said holes.

5. A seat assembly as claimed in claim 4, in which said armrest is equipped with a switch which connects said rechargeable vibrator to said metal rods for switching said rechargeable vibrator on and off.

6. A seat assembly as claimed in claim 5, wherein said armrest is generally L-shaped and has a horizontal portion and a vertical portion, said horizontal portion being larger than said vertical portion and having said vibrator disposed therein, said vertical portion having a front surface in which said switch is disposed.

7. A seat assembly as claimed in claim 6, wherein said armrest holder is generally rectangular in shape and encloses therein said metal rods when said metal rods are inserted into said holes up to a certain position.

8. A seat assembly comprising:
    a seat proper;
    an armrest having two metal rods projecting therefrom, said metal means for providing sole support for said armrest;
    a rechargeable vibrator disposed in said armrest and rechargeable through said metal rods which serve as electric terminals; and
    a pair of armrest holders secured to both sides of said seat proper respectively, each armrest holder being constructed to detachably hold said armrest, each armrest holder having two holes dimensioned to receive said metal rods therein.

9. An arrangement comprising:
    a first seat proper;
    a second seat proper positioned beside said first seat proper seat to create a space therebetween;
    an armrest having two metal rods projecting therefrom, said metal rods being means for providing sole support for said armrest;
    a rechargeable vibrator disposed in said armrest and rechargeable through said metal rods which serve as electric terminals; and
    a pair of armrest holders secured to both sides of said second seat proper respectively, each armrest holder being constructed to detachably hold said armrest, each armrest holder having two holes dimensioned to receive said metal rods therein.

* * * * *